US012431678B2

(12) United States Patent
Chen et al.

(10) Patent No.: US 12,431,678 B2
(45) Date of Patent: Sep. 30, 2025

(54) ADAPTER FOR A LOW INTERMODULATION BOARD-TO-BOARD RF COAXIAL CONNECTION ASSEMBLY

(71) Applicant: RADIALL, Aubervilliers (FR)

(72) Inventors: Gong Chen, Shanghai (CN); Shan Qin, Shanghai (CN); Chen Su, Shanghai (CN)

(73) Assignee: RADIALL, Aubervilliers (FR)

( * ) Notice: Subject to any disclaimer, the term of this patent is extended or adjusted under 35 U.S.C. 154(b) by 37 days.

(21) Appl. No.: 17/755,805

(22) PCT Filed: May 13, 2020

(86) PCT No.: PCT/CN2020/090111

§ 371 (c)(1),
(2) Date: May 9, 2022

(87) PCT Pub. No.: WO2021/226897

PCT Pub. Date: Nov. 18, 2021

(65) Prior Publication Data

US 2023/0056565 A1 Feb. 23, 2023

(51) Int. Cl.

*H01R 31/06* (2006.01)
*H01R 12/70* (2011.01)
(Continued)

(52) U.S. Cl.

CPC ........... *H01R 31/06* (2013.01); *H01R 12/707* (2013.01); *H01R 12/7082* (2013.01);
(Continued)

(58) Field of Classification Search

CPC .. H01R 31/06; H01R 12/707; H01R 12/7082; H01R 12/91; H01R 24/50; H01R 24/542; H01R 12/73; H01R 2103/00
See application file for complete search history.

(56) References Cited

U.S. PATENT DOCUMENTS 8,016,614 B2 9/2011 Xie et al.
8,801,459 B2 8/2014 Mrowka
(Continued)

FOREIGN PATENT DOCUMENTS

CN 104577400 A 4/2015
CN 106159504 A 11/2016
(Continued)

OTHER PUBLICATIONS

Translation of CN207732217 (Year: 2018).*
(Continued)

*Primary Examiner* — Briggitte R. Hammond
(74) *Attorney, Agent, or Firm* — Chrisman Gallo Tochtrop LLC

(57) ABSTRACT

The present application relates to a coaxial connector, intended to transmit radio frequency RF signals, of longitudinal axis X, including: —an outer contact forming a body/casing, which at least one of its ends is slotted defining contact petals, a central contact and, —at least one electrical insulating solid structure coaxially interposed between the central contact and the outer contact, which is mechanically retained in the outer contact and in which the central contact is mechanically retained, at least one of the free end of the electrical insulating solid structure having an elasticity of its periphery, at the level of the petals of the outer contact, which is increased compared to the rest of the electrical insulating solid structure.

13 Claims, 5 Drawing Sheets

(51) Int. Cl.

| | |
|---|---|
| ***H01R 12/73*** | (2011.01) |
| ***H01R 12/91*** | (2011.01) |
| ***H01R 24/50*** | (2011.01) |
| ***H01R 24/54*** | (2011.01) |
| ***H01R 103/00*** | (2006.01) |

(52) U.S. Cl.

CPC ............. *H01R 12/91* (2013.01); *H01R 24/50* (2013.01); *H01R 24/542* (2013.01); *H01R 12/73* (2013.01); *H01R 2103/00* (2013.01)

(56) References Cited

U.S. PATENT DOCUMENTS

| | | | |
|---|---|---|---|
| 9,484,688 | B2 | 11/2016 | Hugel et al. |
| 11,677,196 | B2 | 6/2023 | Tang et al. |
| 2005/0277331 | A1 | 12/2005 | Hall |
| 2012/0295478 | A1 | 11/2012 | Mrowka |
| 2018/0277997 | A1 | 9/2018 | Vaccaro |
| 2018/0301834 | A1 | 10/2018 | Dandl et al. |
| 2019/0165525 | A1 | 5/2019 | Gartmann |
| 2022/0037840 | A1 | 2/2022 | Tang et al. |

FOREIGN PATENT DOCUMENTS

| | | | | |
|---|---|---|---|---|
| CN | 207732217 | U | * | 8/2018 |
| CN | 110391517 | A | | 10/2019 |
| CN | 210120293 | U | | 2/2020 |
| CN | 110994299 | A | | 4/2020 |
| CN | 210326256 | U | | 4/2020 |
| WO | 2017/059950 | A1 | | 4/2017 |

OTHER PUBLICATIONS

Indian Office Action for corresponding Indian Application No. 202227027181 mailed Dec. 22, 2022 and English translation.

International Search Report for corresponding International Application No. PCT/CN2020/090111 mailed Feb. 18, 2021.

Written Opinion for corresponding International Application No. PCT/CN2020/090111 dated Feb. 18, 2021.

Extended European Search report for corresponding European Application No. 20935218.6.

* cited by examiner

ADAPTER FOR A LOW INTERMODULATION BOARD-TO-BOARD RF COAXIAL CONNECTION ASSEMBLY

TECHNICAL FIELD

The present invention relates to a connector, intended in particular to transmit radio frequency RF signals.

In the framework of the invention the term "connector" includes a plug or jack, a receptacle, an adapter as well as a bullet.

The applications particularly targeted by the invention are the connection of telecommunication equipment such as base transceiver stations BTS, RRU/RRH (Remote Radio Unit/Remote Radio Head) units, antenna integrated RRU/RRH solution and distributed antenna systems for the wireless communications market.

The invention also relates generally to the connectors in the telecommunication domain, in the medical domain, the industrial domain, the aeronautical domain, the transport domain and the space domain.

The connectors according to the invention can be used in particular to link two parallel printed circuit boards, usually called a board-to-board connecting system or even a printed circuit board to another component such as a module, a filter or a power amplifier or an antenna, or module to module.

The invention more particularly aims to propose a RF coaxial connection assembly with an improved low passive intermodulation product generation behaviour in static or vibrating conditions.

PRIOR ART

Radio frequency (RF) coaxial connectors are usually installed on cables or signal transmission devices, and separable components for electrical connection of transmission line systems can be used for circuit board to circuit board (board-to-board), circuit board (PCB) to RF module or RF module to RF module (board-to module) interconnection.

Existing RF coaxial connectors typically include a central contact, an outer contact, and a solid insulating structure arranged between the central contact and the outer contact, the central contact being supported by the insulating structure to get suitable relative coaxial position with the outer contact and ensure good RF performances.

Existing RF coaxial connectors are largely used as components of connection assemblies intended for the so-called board-to-board or board-to-module connections.

The connection assemblies is also known, for example marketed under the names SMP-MAX by the Radiall company, such as disclosed in U.S. Pat. No. 8,016,614B2 patent, or else marketed under the names MBX by the Huber & Sühner company, such as described in U.S. Pat. No. 8,801,459B2 patent, or else marketed under the name AFI by the Amphenol RF company, or else marketed under the name Long Wipe SMP and P-SMP by the Rosenberger company.

Such connections, to link two printed circuit boards, generally consist of three elements, namely: a first receptacle with snap-fitting (or "snap") type or of retention type, a second receptacle of sliding type with a guiding cone ("slide on receptacle"), and a connection coupling or adapter with the first and second receptacles respectively fastened to the ends thereof. The connection is therefore made blind by the re-centering of the connection coupling by means of the guiding cone of the sliding receptacle.

The contacts of the elements are conventionally made of brass, bronze or CuBe2 and may be provided at their ends with elastic means (petals and slots for example) that cooperate with the contacts of their counterpart element.

These connections rely on the deflection of the adapter on the snap-fitting end (first receptacle) and on the sliding end (second receptacle) to achieve a radial tolerance of alignment. The adapter can be fixed in the first receptacle, notably by clipping the end of the outer contact into the body, whereas the other end can be sliding floating mounted in the second receptacle, which gives the axial misalignment.

CN106159504A patent application also discloses a bump shape on the inside of the petals of the central contact of an adapter.

The application of the above-mentioned patents in telecom market was mainly used in RRU, there is no intermodulation requirement, or the intermodulation level is very low, such as −130 dBc, 2×20 W or less level.

In the traditional equipment (3G/4G) of mobile communication systems, low intermodulation components were used as connection between RRU and the external antenna, such as well-known connectors under the series 7-16, series 4.3-10 and NEX10®, which have the low intermodulation levels for cable assembly, −155 dBc, 2×20 W. In these applications, the connectors are always assembled with cable and connected to the antenna.

However, with the development of for the mobile communication systems of the fifth generation (5G), and the emergence of FDD massive MIMO systems antennas and RRUs are required to be integrated into a unique device, which requires the low intermodulation level equivalent to former 7/16, 4.3-10 or NEX10®, typically-155 dBc under two carriers of 20 Watt that support all features of traditional board to board interconnection, such as axial/radial misalignment components at the same time. The current existing board-to-board connections or low intermodulation level connections are not completely satisfying due to the specific constraints of such systems.

U.S. Pat. No. 9,484,688B2 patent discloses a limiting element of the arrangement of the insulating material at the opening of a half-lock end socket to limit the lateral movement of the adapter, to prevent multiple points of radial contact of the outer conductor, and to prevent the interference caused by the non-linearity of the outer conductor from affecting the antenna.

CN110391517A patent application discloses the arrangement of a spherical bump at the end of the insulator of an adapter to prevent axial multi-point contact at the end face of the outer conductor, thereby reducing contact nonlinearity.

Indeed, in these 5G systems, video, voice, picture, and data signals that pass through a fixed bandwidth are required to increase significantly. The board-to-board or board-to-module RF connectors need to transmit multiple carrier signals at the same time. The transmission media all have a certain degree of non-linearity. These signals of different frequencies are mixed together to produce a kind of spurious signal-passive intermodulation, especially the third order and fifth-order intermodulation are very easy to fall into the receiving and transmitting frequency band, resulting in a reduction in communication quality.

The non-linearity of the connectors is the root cause of passive intermodulation. The non-linearity of the connectors is usually caused by material nonlinearity and contact nonlinearity. In terms of material nonlinearity, non-magnetic materials and coatings are usually used, and attention to device cleaning can be avoided. In terms of contact nonlinearity, the existing board-to-board connectors have not completely avoided this problem: during working conditions, other sources of intermodulation products may appear.

For example, due to the warp of the circuit board, cumulative tolerance from components manufacture, components soldered on PCB or assembled in the modules, the board-to-board connectors usually need to provide certain axial and radial tolerances to eliminate its impact, which needs to be achieved through the deflection and sliding of the adapter.

In the existing board-to-board connectors, no consideration is given to improving the contact stability of the connector during deflection.

Furthermore, the RRU's and antennas are installed outdoors and often need to work in a vibrating environment. The contact stability of the connectors under vibration and shock conditions needs to be considered.

There is therefore a need to further improve the RF connectors, more particularly their intermodulation stability under working conditions with large radial misalignment and/or large axial misalignment and especially under vibration and shock conditions in a vibrating environment, in order for them to be able to be used in a reliable way in the fifth-generation (5G) of mobile communication systems.

The invention aims to address all or some of these needs.

Explanation of the Invention

The subject of the invention is thus a coaxial connector, intended to transmit radio frequency RF signals, of longitudinal axis X, comprising:

- an outer contact forming a body/casing, which at least one of its ends is slotted defining contact petals,
- a central contact and,
- at least one electrical insulating solid structure coaxially interposed between the central contact and the outer contact, which is mechanically retained in the outer contact and in which the central contact is mechanically retained, at least one of the free ends of said electrical insulating solid structure having an elasticity at the level of the petals of the outer contact, which is increased compared to the rest of said electrical insulating solid structure.

Preferably, the increased elasticity ensures a uniformly distributed deformation of the petals of the outer contact or acts as a damper, when the connector is under working conditions.

According to an embodiment, the increased elasticity is achieved by at least one axially opening groove formed on at least part the periphery of said electrical insulating solid structure.

According to another embodiment, the increased elasticity is achieved by at least one compressible gasket, accommodated in a radially opening groove formed on the periphery of said electrical insulating solid structure.

According to another embodiment, the increased elasticity is achieved by a plurality holes distributed on at least part the periphery of said electrical insulating solid structure.

Thus, the first aspect of the invention mainly consists of providing an increased elasticity, achieved advantageously by a front-end groove, at at least one end of an electrical insulating solid structure of a coaxial connector which outer contact is slotted defining petals. This end groove provides a certain degree of elasticity, thus ensuring a reinforced contact pressure between the electrical parts of the adapter and receptacles interfaces. It also ensures an uniformly distributed deformation of the petals of the outer contact and/or of the inner contact of the connector, while at the same time ensuring the adapter can be manipulated easily during inserting to and extracting from snap receptacle.

Moreover, this groove can play a buffering role during vibrations and shocks, thereby improving the intermodulation stability of the connector under dynamic working conditions/environment.

In a preferred embodiment, each of the outer contact and the central contact is a symmetric structure, the connector comprising two identical electrical solid insulating structures.

In an advantageous variant, the axially opening groove is an annular groove.

In another advantageous embodiment, at least one end of the central contact is slotted defining contact petals each shaped at its front end with a bump, the inner diameter defined by the bumps being the smallest inner diameter of the central contact.

According to a first embodiment, the outer contact and the electrical insulating solid structure are configured such that in a connection state with a complementary connector, the outer diameter of said electrical insulating solid structure is substantially the same as the inner diameter of said outer contact, thus ensuring a uniformly distributed deformation of the petals of the contacts of the connector.

According to a second embodiment, the central contact and the electrical insulating solid structure are configured such that in a connection state with a complementary connector, the inner diameter of said electrical insulating solid structure is substantially the same as the outer diameter of said central contact.

By "substantially" it must be understood in the framework of the invention, that the difference between the diameters is low.

The invention also concerns a connection assembly, intended in particular to link two printed circuit boards (PCBs) or a PCB and a module or two modules, comprising:

- a first receptacle forming a first end socket, intended to be installed in a filter body or cavity or brazed or welded on a first printed circuit board, said first receptacle comprising a pin central contact,
- a second receptacle forming a second end socket, intended to be installed in a filter body or cavity or brazed or welded on a second printed circuit board, said second receptacle comprising a pin central contact,
- a coaxial connector, called adapter, such as described above, wherein the pin central contact of the first end socket is intended to be inserted into one end of the central contact of the adapter whereas the pin central contact of the second end socket is intended to be inserted into another end of the central contact of the adapter.

According to an advantageous embodiment, the adapter is intended to be snapped into the first end socket, and to slide relative to the second end socket in order to achieve axial tolerance during the connection. These connections rely on the deflection of the adapter on the snap-fitting end (first receptacle) and sliding in second receptacle to achieve a radial tolerance of alignment.

The subject-matter of the invention is also a receptacle forming an end socket, for the connection assembly such as described above, comprising a pin central contact and an outer contact and an electrical insulating solid structure which front end has a ring-shaped bump and/or a gasket made of a shock absorbing material, said gasket being arranged between an annular axially opening groove of the electrical insulating solid structure and the outer contact of the receptacle. Preferably, said gasket is in silicone rubber.

Said ring-shaped bump and/or said gasket is intended to be against the electrical insulating solid structure of the adapter, which ensures to this latter to not have any contact with the outer contact of the adapter, during working conditions.

In an advantageous embodiment, its pin central contact has a shoulder, said ring-shaped bump axially exceeds said shoulder.

DETAILED DESCRIPTION

Other advantages and features of the invention will become more apparent on reading the detailed description of exemplary implementations of the invention, given as illustrative and non-limiting examples with reference to the following figures in which.

Figure 1:
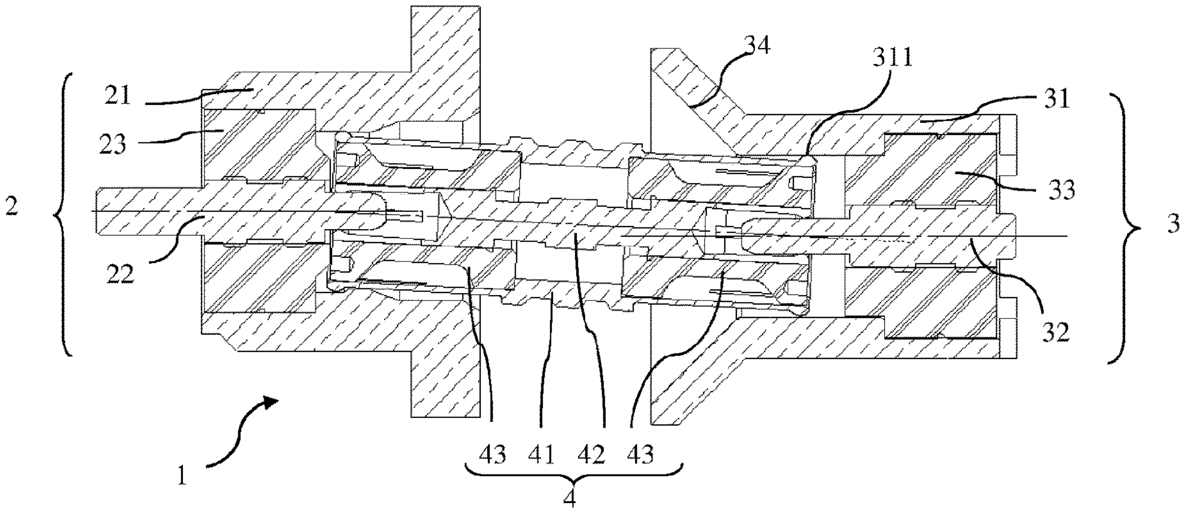
FIG. 1 is a longitudinal cross-sectional view of an exemplary RF coaxial connection assembly, intended to link module to printed circuit board comprising two receptacles forming end sockets joined with a coaxial connector forming a connection coupling or adapter according to the invention, in a connection configuration.
Figure 6A:
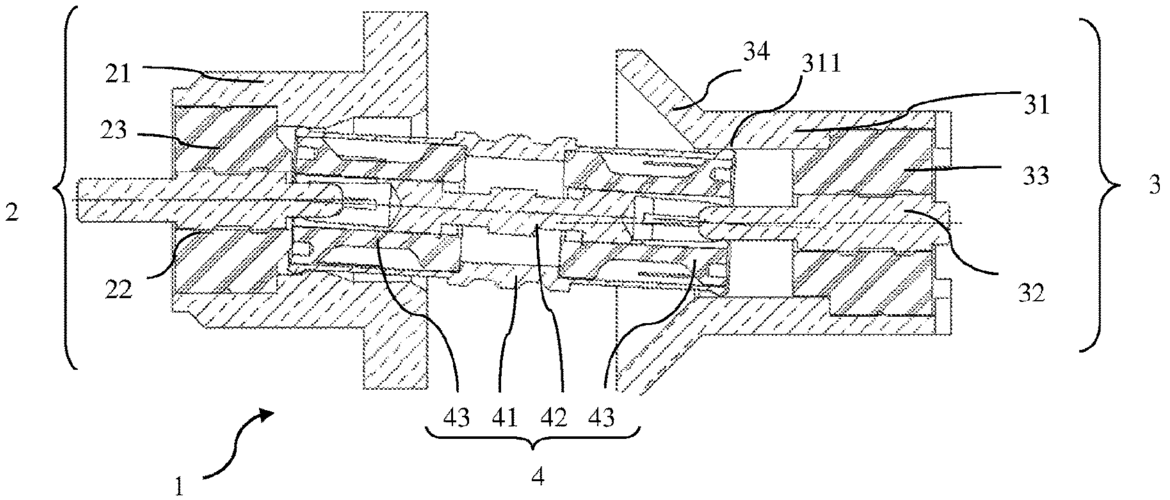
Figure 6B:
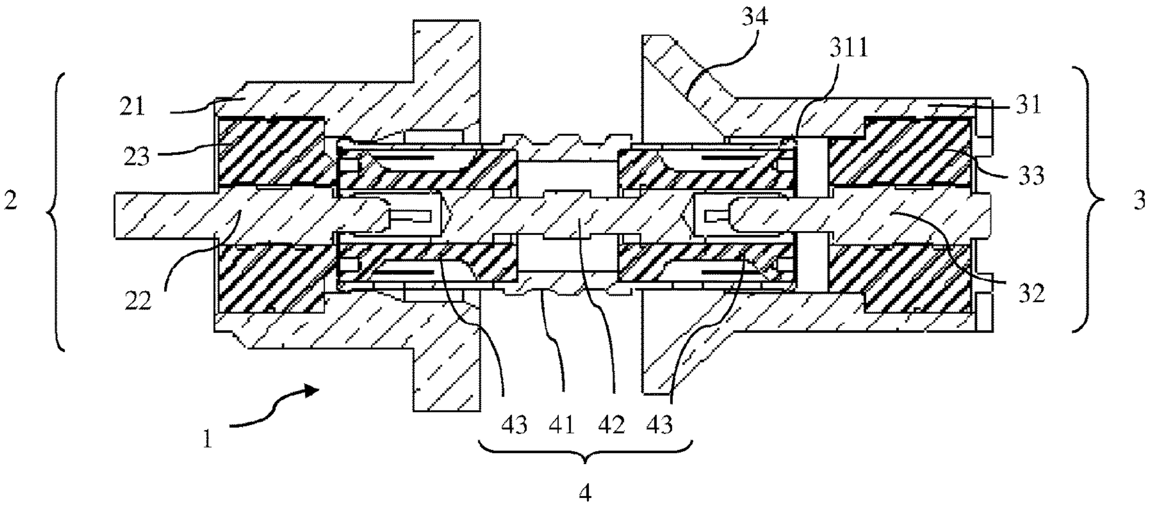
Figure 6C:
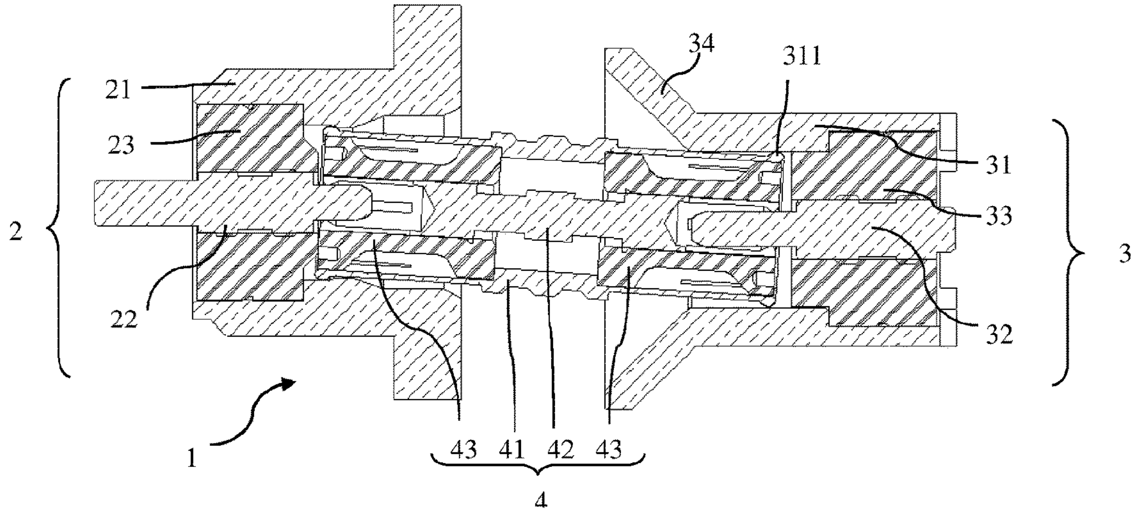
Figure 7:
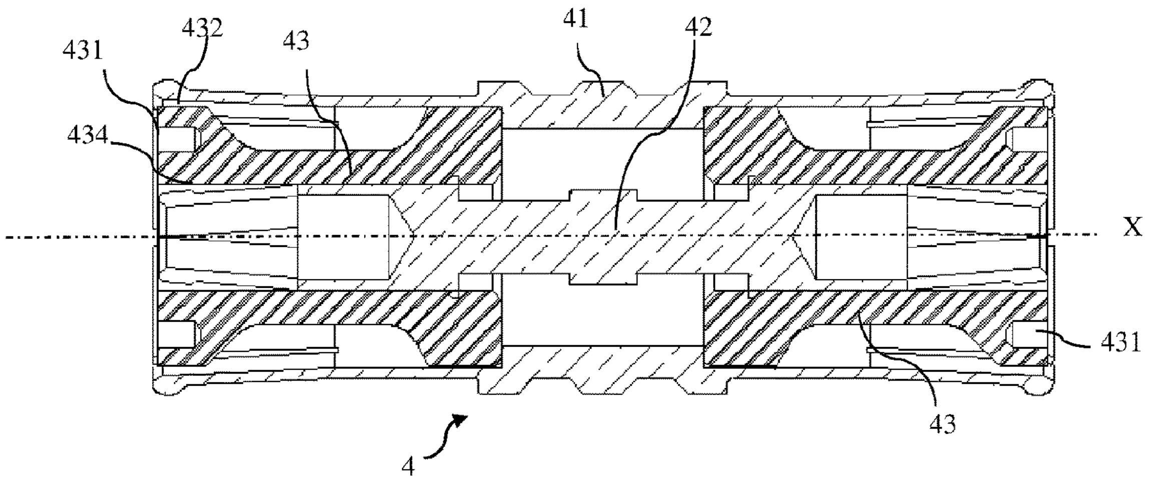
Figure 8:
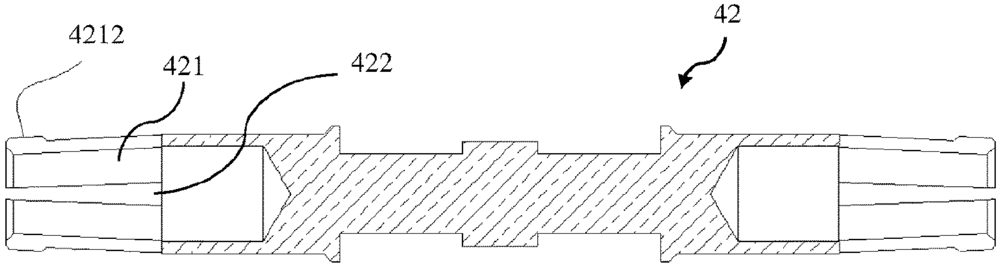
Figure 9:
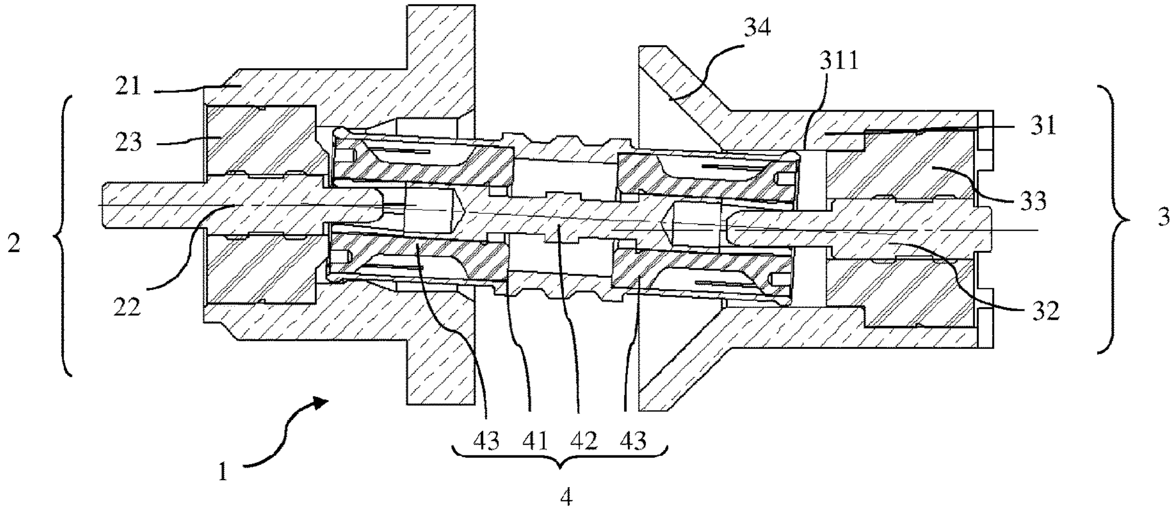
Figure 10:
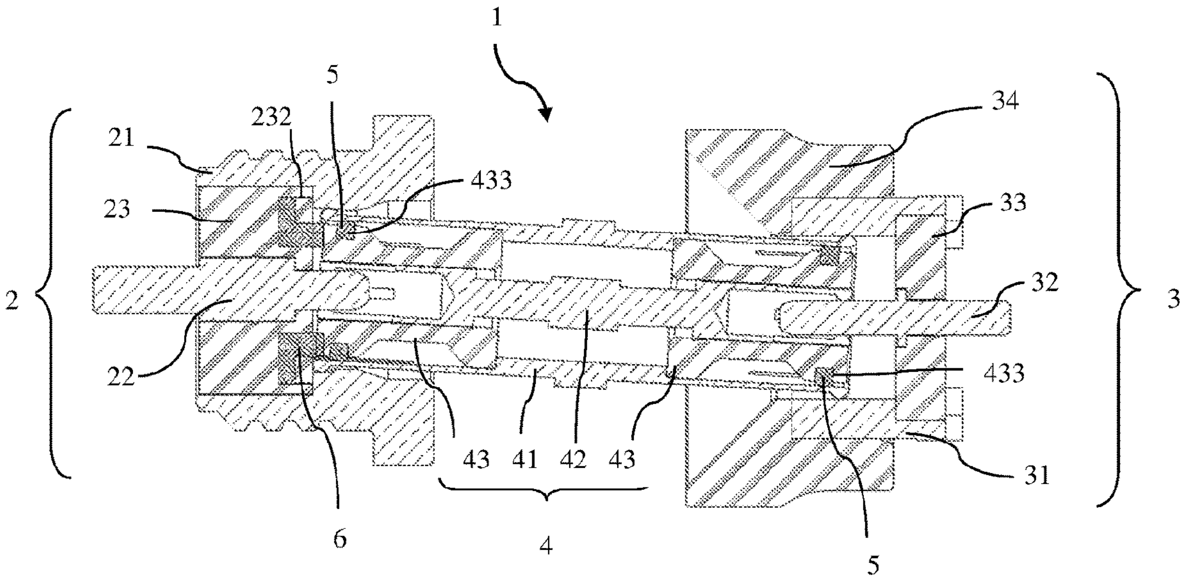

FIGS. 6A to 6C are longitudinal cross-sectional views of the exemplary RF coaxial connection assembly according to FIG. 1, showing different connection configurations with the sliding of the adapter to respectively the maximum, intermediate, and minimum board-to-module distance. FIG. 6A corresponds to a maximum distance between receptacles and a maximum radial misalignment between them. FIG. 6B corresponds to a nominal working condition without any misalignment. FIG. 6C corresponds to a minimum distance between receptacles and a maximum radial misalignment;

FIG. 7 is a longitudinal cross-sectional view of a second embodiment of the adapter according to the invention;

FIG. 8 is a longitudinal cross-sectional view of the central contact of the adapter of FIG. 7;

FIG. 9 is similar to FIG. 1, but with the second embodiment of the adapter according to the invention;

FIG. 10 is similar to FIG. 1 or 9, but with another embodiment for the increased elasticity of the solid insulating structure of the adapter and for the bump function of the insulating solid structure of the end socket.

In clarity purposes, the same references designating the same elements of a connector according to the invention are used for all the FIGS. 1 to 10.

Hereinafter, the invention is described with reference to any type of RF line.

FIG. 1 shows a coaxial connection assembly 1 comprising a first receptacle 2 forming an end socket, called snap fitting end socket, a second receptacle 3 forming an end socket, called sliding end socket, and connection coupling or adapter 4, usually called bullet, according to the invention.

Figure 2:
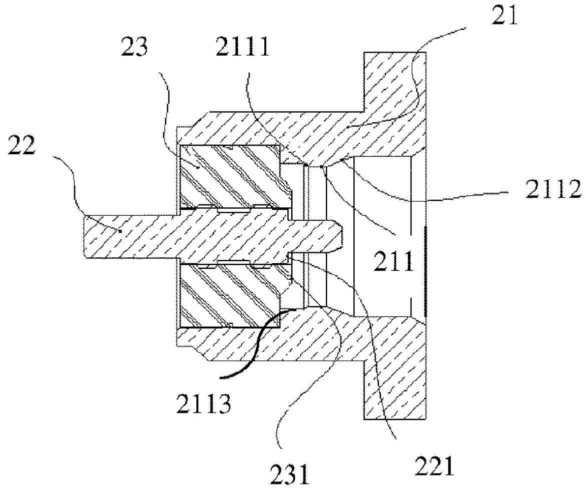
FIG. 2 is a longitudinal cross-sectional view of one of the end socket of the exemplary coaxial connection assembly according to FIG. 1.

As shown on FIG. 2, the first receptacle 2 is intended to be installed in a filter body or cavity. The first receptacle 2 comprises a rigid body 21 with a recess and a contact pin 22, the recess of the body 21 being arranged at the periphery of the contact pin 22.

The rigid body 21 forms a ground outer contact.

An insulator 23 is positioned between the ground outer contact 21 and the contact pin 22.

The recess of the body 21 houses the contact pin 22 and the insulator 23.

As shown, the contact pin 22 comprises a shoulder 221.

The insulator 23 which front end has a ring-shaped bump 231.

The relative arrangement between the contact pin 22 and the insulator is such that the ring-shaped bump 231 axially exceeds the shoulder 221. The function of the ring-shaped bump 231 is to avoid that the petals of the outer contact 41 of the adapter 4 directly contact the insulator 23 of the receptacle 2, since such a contact would interfere with the deformation of the outer contact 41.

Besides, an annular inner wall of the outer contact 21 is shaped as an annular bump 211 around the contact pin 22. The annular bump 211 is extended with inclined surfaces 2111 and 2112 inside the body 21. This annular bump ensures that the adapter 4 always stays in the snap side connector, when an user opens the board-to-module to check and repair the system, especially when there are several connections in B2M systems (usually 8, 16, 32, 64 sets).

The second receptacle 3 is intended to be brazed or welded to a printed circuit board and comprises a rigid body 31 with a recess, a contact pin 32, the recess of the body 31 being arranged at the periphery of the contact pin 32.

The rigid body 31 forms a ground outer contact.

An insulator 33 is positioned between the ground outer contact 31 and the contact pin 32.

The recess of the body 31 houses the contact pin 22 and the insulator 33.

The body 31 of the second receptacle 3 also presents a centring end piece comprising a centring surface 34. As illustrated in FIG. 1, the centring surface 34 is of annular shape and of circular section.

The coaxial RF adapter 4 according to the invention is of longitudinal axis X and has a symmetric structure.

Figure 3:
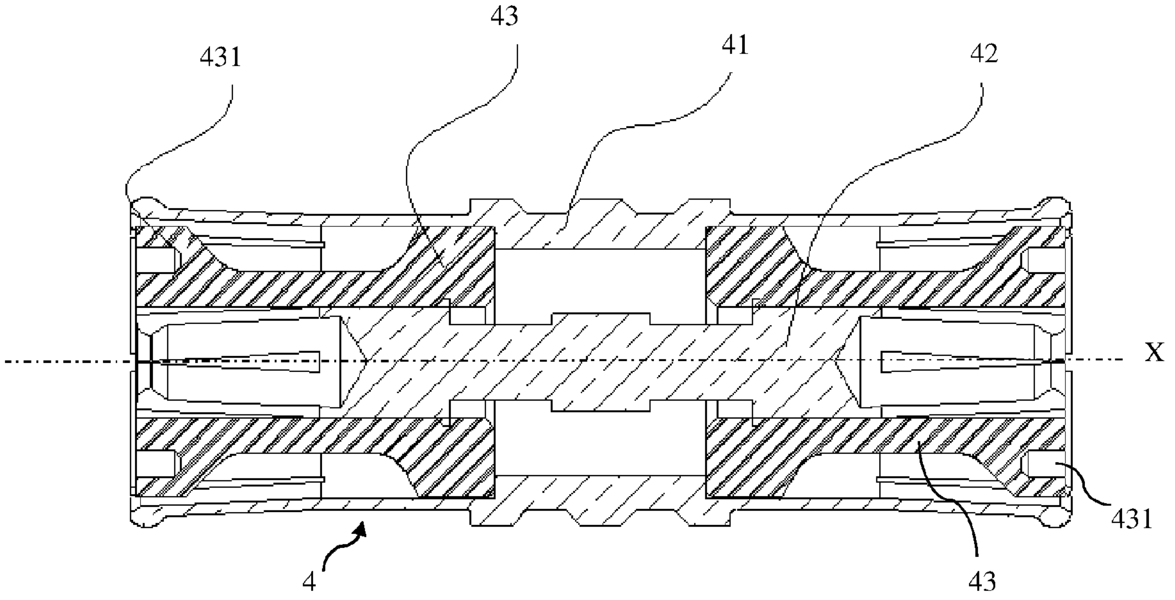
FIG. 3 is a longitudinal cross-sectional view of a first embodiment of the adapter according to the invention, such as arranged in the exemplary coaxial connection assembly according to FIG. 1.

As illustrated in FIG. 3, a first embodiment of a coaxial RF adapter 4 comprises, as axisymmetric components, an outer contact 41 forming a body, a central contact 42, and two identical electrical insulating solid structures 43 interposed between the central contact 42 and the outer contact 41.

The central contact 42 is mechanically retained by the insulating structures 43 and the shape and the sizing of these components allow them to support any part of the central contact 42, notably to prevent excessive deformation of it.

The solid insulating structures 43 are mechanically retained into the outer contact 41 and the shape and the sizing of the insulating structures 43 allow them to support any part of the outer contact 41, notably to prevent excessive deformation of it at any direction (radial and circumferential direction).

The central contact 42 has the functions of RF signal transmission together with the ground contact 41 through the insulating structures (including air), of conformance to dimensional characteristics requested by the equipment and of conformance to mechanical performances and assembling requests. Their general shapes are designed in order to adapt the impedance and transmit the RF signal with a minimum of losses and reflections.

Figure 4:
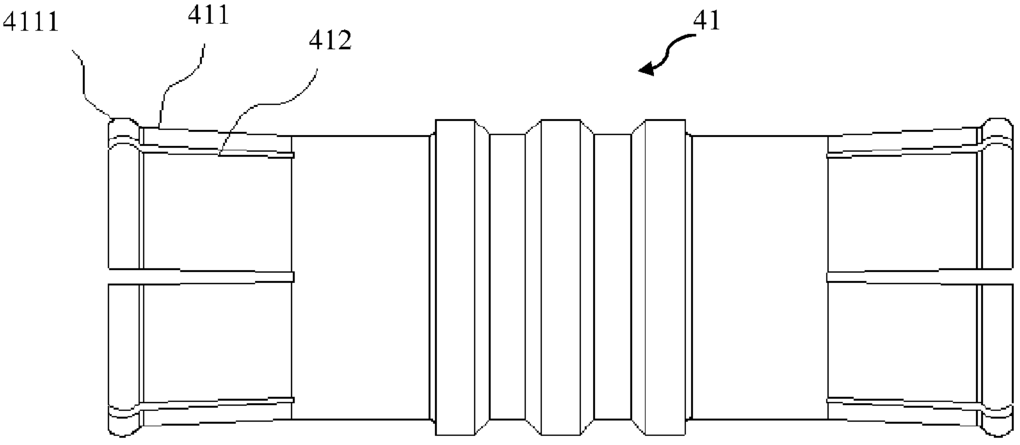
FIG. 4 is a perspective view of the outer contact of the adapter of FIG. 3.

As shown on FIG. 4, the two ends of the outer contact 41 are slotted forming a plurality of flaps, generally called petals 411, each being delimited between two adjacent axial grooves 412 and acting as a spring towards an outside radial direction to the contact 41. The front end of each petal 411 is shaped with a bump 4111.

Figure 5:
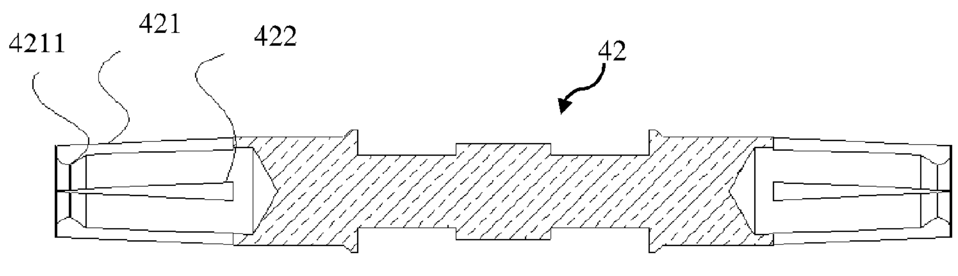
FIG. 5 is a longitudinal cross-sectional view of the central contact of the adapter of FIG. 3.

As shown on FIG. 5, the two ends of the central contact 42 are slotted forming a plurality of flaps, generally called petals 421, each being delimited between two adjacent axial grooves 422 and acting as a spring towards an inside radial direction to the contact 42. The front end of each petal 421 is shaped with a bump 4211.

According to the invention, each of the insulating structure 43 is provided with a front annular groove 431 extending along the axial direction X. The annular groove 431 is opened toward the outside of the adapter 1.

Now, the connection state will be described.

When the adapter 4 is connected to the first receptacle 2 and to the second receptacle 3, as illustrated in FIG. 1, the petals 421 of each end of the central contact 42 are open and in forced contact respectively with the contact pins 22, 32.

The outer diameter of the solid insulating structure 43 is substantially the same as the inner diameter of the petals 411 of the outer contact 41 after radial compression in both first receptacle 2 and second receptacle 3. The surface 432 of the solid insulator structure limits the displacement of the petals 411. The annular groove 431, and the associated increased elasticity in this area ensures that the distributed contact force of each petal 411 on the rigid bodies 21, 31 is uniform.

During working conditions such as under radial misalignment as shown on FIG. 6A or 6C, or during vibrations and/or shocks, the outer contact 41 may be more deflected than in the nominal working conditions of FIG. 6B. But the increased elasticity maintains the uniformity of the contact force of each petal 411 in these configurations.

In other words, during said deflection, the deformation amount of each petal 411 acting as a spring is the same and not over-pressed, thereby ensuring that the contact between the adaptor 4 and the first end socket 2 and second end socket 3 is stable and uniform, eliminating the contact nonlinearity of a board-to-board connection assembly according to the prior art.

In the same way, the inner diameter of the solid insulating structure 43 is substantially the same as the outer diameter of the petals 421 of the inner contact 42 after radial compression in both first receptacle 2 and second receptacle 3. The surface 434 of the solid insulator structure limits the displacement of the petals 421. The annular groove 431, and the associated increased elasticity in this area ensures that the distributed contact force of each petal 421 on the central contacts 22, 32 is uniform, whatever the conditions of deflection of the petals are.

Figure 1A:
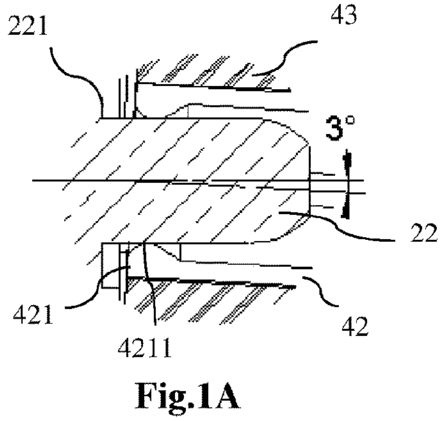
FIG. 1A is a detail view of FIG. 1 showing the coupling between the central contact of the adapter with the pin central contact of one of the end socket.

In an advantageous embodiment, as shown on FIG. 1A, the petals 421 of the central contact 42 of the adapter 4 are provided with bumps 4211 on their inner diameter on the side of the first socket 2, the central pin contact 22 is in forced contact with the bumps 4211. As explained below, the inner diameter of the central contact 42 defined by the bumps 4211 is the smallest diameter of said contact 42 such that the central pin contact 22 of the socket 2 can be freely deflected inside. The annular groove 431 of the insulator 43 allows a uniform deformation of petals 421 which allows an intermodulation stability, especially during working conditions, under radial misalignment and/or with vibrations for example. The connection state and effect are also the same on the connecting area of central contact 42 with the pin contact 32 on the second socket 3.

Hence, the intermodulation stability of the connection assembly 1 is improved.

The groove 431 does not need to be continuous on the whole periphery of the solid insulating structure 43. Interrupted holes provided along the periphery can also increase the elasticity of the solid insulating structure 43.

In an advantageous embodiment, one of the end surfaces of the adapter 4 can be semi-locked fixed in the first receptacle 2, notably by clipping the end of the outer contact 41 into the body 21, whereas the other end can be floating mounted in the second receptacle 3.

On the slide side, the centring surface 34 guides and ensures the adapter 4 can be inserted into the receptacle 3 under blind mating, the surface 311 of the second socket 3 cooperates with the outer contact 41 of the adapter 4, defining a sliding link between bump 4111 of adapter 4 and surface 311 of receptacle. The bump 4111 of petals 411 is compressed by the surface 2113 and 311, the surface 432 of solid insulating structure 43 limits the displacements the petals to ensure that the bump 4111 has a good contact with the outer contact/body of receptacle 2 and 3 during all working conditions, such as under misalignment and/or vibrations and/or shock.

Moreover, on the snap side, during insertion or extraction of the adapter 4 in the receptacle 2, the bumps 4111 of the petals 411 of the outer contact 41 are compressed against the annular bump 211. The increased elasticity of the insulator 43 due to the annular groove 431 avoids any damage or breakage of the petals 411 against the annular bump 211.

Hence, according to the invention, the annular groove 431 of each solid insulating structure 43 of the adapter 4 provides a certain degree of elasticity. This elasticity allows insertion and extraction of the adapter 4 in the receptacle 2 without damage and plays a buffering role during misalignment and/or vibration and shock, thereby improving the intermodulation stability of the connection assembly 1, under dynamic working conditions/environment.

In an advantageous embodiment, as shown on FIG. 2, the bump 231 of the insulator 23 of the first end socket 2 will bear against the solid insulating structure 43 of the adapter 4.

In case of a strong misalignment during working conditions as shown on FIG. 6C, the bump 231 prevents any contact between the petals 4111 and the insulator 23.

Therefore, it prevents any modification of the contact pressure of the petals 4111 on the inner surface of the body 21, thereby improving the intermodulation stability of the connection assembly 1, under working conditions. On the first end socket side, since the maximum diameter of the bump 231 of the insulator 23 of the first end socket 2 is smaller than the inner diameter of the petals 411 of the outer contact 41 of the adapter 4 under compression, this latter contact 41 will not be subjected to the frictional force of the insulator 23 during the deflection which may occur under working conditions. This also allows to ensure a uniform deformation of the petals 411 of the outer contact 41.

On the second end socket side, when the minimum plate spacing and the maximum deflection, there is an axial gap between the adapter 4 and the second end socket 3 which ensures that the petals 411 of the outer contact 41 of the adapter 4 will not be subjected to the frictional force of insulator 33 during deflection. This allows to ensure a uniform deformation of the outer contact 41.

FIGS. 7 to 9 shows a second embodiment of the adapter 4. In this embodiment, a bump 4212 is provided on the outside diameter of the front end of each petal 421 of the central contact 42. Due to the presence of said bump 4212 when a central pin contact 22 or 32 is inserted inside an end of the central contact 42, the outer diameter of the bump 4212 and the inner diameter of the solid insulating structure 43 is substantially the same, which renders stabile the deformation of the central contact 42.

FIG. 10 shows alternatives.

Instead of having an axial opening annular groove 431, one compressible gasket 5 is accommodated in a radially opening groove 433 formed on at the periphery of the electrical insulating solid structure 43 of the adapter. In this configuration the diameter of the electrical insulating solid structure 43 should be reduced, at least at its ends, with the radial opening groove 433, in order to free space for the gasket 5.

Also, the ring-shaped bump 231 can be replaced by a gasket 6 made of a shock absorbing material, which is arranged between an annular axially opening groove 232 of the electrical insulating solid structure 23 and the outer contact 21 of the receptacle.

Other variants and enhancements can be provided without in any way departing from the framework of the invention.

If all the shown examples are more specifically about an insulating solid structure with an annular groove, several discontinuous grooves arranged uniformly in a radial direction can be foreseen.

The expression "comprising a" should be understood to be synonymous with "comprising at least one", unless otherwise specified.

The invention claimed is:

1. A coaxial connector, intended to transmit radio frequency RF signals, of longitudinal axis X, comprising:
- an outer contact forming a body/casing, which at least one end of the outer contact is slotted defining contact petals,
- a central contact and,
- at least one electrical insulating solid structure coaxially interposed between the central contact and the outer contact, which is mechanically retained in the outer contact and in which the central contact is mechanically retained,
- at least one free end of the electrical insulating solid structure having an elasticity at a periphery of the at least one free end, at a level of the contact petals of the outer contact, which is increased compared to a remainder of the at least one electrical insulating solid structure,
- wherein the outer contact and the electrical insulating solid structure is configured such that in a connection state with a complementary connector, an outer diameter of the at least one electrical insulating solid structure is substantially equal to an inner diameter of the outer contact, and
- wherein the increased elasticity is achieved by at least one axially opening groove formed on at least part the periphery of the electrical insulating solid structure.

2. The coaxial connector according to claim 1, wherein the increased elasticity ensures a uniformly distributed deformation of the contact petals of the outer contact or acts as a damper, when the connector is under working conditions.

3. The coaxial connector according claim 1, wherein the axially opening groove is an annular groove.

4. The coaxial connector according to claim 1, wherein the increased elasticity is achieved by at least one compressible gasket accommodated in a radially opening groove formed on the periphery of the electrical insulating solid structure.

5. The coaxial connector according to claim 1, wherein the increased elasticity is achieved by a plurality of holes distributed on at least part the periphery of the electrical insulating solid structure.

6. The coaxial connector according to claim 1, wherein at least one end of the central contact is slotted defining contact petals, each contact petal of the central contact being shaped at a front end of the contact petal with a bump, an inner diameter defined by the bumps being a smallest inner diameter of the central contact.

7. The coaxial connector according to claim 1, wherein at least one end of the central contact is slotted defining contact petals, each contact petal of the central contact being shaped at a front end of the contact petal with a bump, an outer diameter defined by the bumps being a biggest outer diameter of the central contact.

8. The coaxial connector according to claim 1, wherein the central contact and the electrical insulating solid structure are configured such that in a connection state with a complimentary connector, an inner diameter of the electrical insulating solid structure is substantially equal to an outer diameter of the central contact.

9. The coaxial connector according to claim 1, wherein each of the outer contact and the central contact is a symmetric structure, the connector comprising two identical electrical solid insulating structures.

10. A coaxial connection assembly comprises:
- a first receptacle forming a first end socket, intended to be installed in a filter body or cavity or brazed or welded to a first printed circuit board, the first receptacle comprising a pin central contact,
- a second receptacle forming a second end socket, intended to be installed in a filter body or cavity or brazed or welded to a second printed circuit board, the second receptacle comprising a pin central contact,
- a coaxial connector, called adapter, according to claim 8, wherein the pin central contact of the first end socket is intended to be inserted into one end of the central contact of the adapter whereas the pin central contact of the second end socket is intended to be inserted into another end of the other central contact of the adapter.

11. The coaxial connection assembly according to claim 10, wherein the adapter is intended to be snapped into the first end socket, and to slide relative to the second end socket in order to achieve axial tolerance during the connection.

12. A receptacle forming an end socket, for the coaxial connection assembly according to claim 10, comprising an outer contact and a pin central contact and an electrical insulating solid structure which front end has a ring-shaped bump, and/or a gasket made of a shock absorbing material, the gasket being arranged between an annular axially opening groove of the electrical insulating solid structure.

13. The receptacle according to claim 12, wherein the pin central contact has a shoulder, the ring-shaped bump axially exceeds the shoulder.

* * * * *